Patented Feb. 10, 1942

2,272,293

UNITED STATES PATENT OFFICE 2,272,293

PROCESS FOR THE THERMAL DEHYDRATION OF LOWER FATTY ACIDS

Henry Dreyfus, London, England, assignor to Celanese Corporation of America, a corporation of Delaware No Drawing. Application December 29, 1938, Serial No. 248,208. In Great Britain January 20, 1938

15 Claims. (Cl. 260—547)

This invention relates to the manufacture of ketene, acetic anhydride and homologues thereof by the thermal dehydration of the corresponding acid in the presence of a catalyst.

The general method of manufacturing ketene or acetic anhydride directly from acetic acid is to subject the acetic acid to thermal decomposition or dehydration, usually in the presence of suitable catalysts. While dehydration takes place over a wide range of temperature, the most useful range is generally 500–1000° C. and especially 600–900° C., though of course the optimum temperature naturally depends upon the particular conditions employed and notably the particular catalyst and the pressure or partial pressure of the acetic acid. In my U. S. Patent No. 1,735,962, I have described catalysing the reaction by means of a phosphoric acid and have indicated that the process may be carried out under reduced pressure or at ordinary pressure. Further, in my U. S. Patent No. 1,883,353, I have shown that it is advantageous to carry out the reaction in the presence of non-metallic bases, and in particular of ammonia and the organic nitrogen bases, for example pyridine, piperidine, aniline, alkyl anilines, toluidines and the like. In this specification it is also indicated that while the reaction may be carried out at pressures higher than atmospheric, it is preferable to employ atmospheric pressure or reduced pressure. The amount of the ammonia, pyridine or other base, may for example be about 1% based on the weight of the acetic acid subjected to thermal decomposition, or may be less than this. In the said specification it is indicated that the bases may be used in conjunction with the known catalysts for promoting the thermal decomposition of the acetic acid, and in particular it is stated that as catalysts there may be used the phosphates of the bases. Obviously, instead of using phosphoric acid itself combined with the base, substances yielding phosphoric acid under the reaction conditions, e. g. triethyl or tricresyl phosphate or other esters of phosphoric acid, may be used together with the bases.

It has now been found that in carrying out processes of the type referred to, in which phosphoric acid alone or together with ammonia or a volatile organic nitrogen base is employed as catalyst, considerable advantage is obtained by having present in the reaction zone copper oxide, preferably in finely divided form. Normally the phosphorus-containing catalyst exerts a corrosive action upon apparatus, and the corrosion of the vessel in which the thermal dehydration is carried out is the more serious the higher the temperature. The presence of copper oxide has been found to suppress this corrosive action and to enable apparatus to be used which would normally be subject to severe corrosion at relatively high reaction temperatures. This fact is of considerable value, since it is at these high temperatures that the highest conversions are obtainable.

In practice effective results have been obtained by suspending the copper oxide in the acetic acid which is to be vaporised, so that when the acid is vaporised it carries with it particles of copper oxide through the preheating apparatus and into the reaction zone.

The quantity of copper oxide employed may be varied considerably, but usually it is unnecessary to employ more than 1% of the weight of the acetic acid being subjected to thermal dehydration, quantities equal to 0.2 to 0.5 of the weight of the acetic acid being sufficient and even smaller quantities, e. g. as little as 0.1% of the weight of the acetic acid, having a noticeable effect. Larger quantities, e. g. 2–3% of the weight of the acetic acid, may however, be employed if desired.

Instead of using copper oxide itself there may also be employed compounds which, under the conditions of the thermal dehydration, are changed into copper oxide, for instance copper hydroxide, copper carbonate or copper acetate. For instance, a small quantity of copper acetate may be added to the acetic acid being subjected to thermal dehydration.

In another method of carrying out the process the copper compound, instead of being dissolved or suspended in the bulk of the acetic acid to be subjected to thermal dehydration, may be dissolved or suspended in a small quantity of acetic acid, water, aqueous acetic acid or other liquid and introduced into the bulk of the acid at a suitable point in the process, for instance it may be injected into the stream of preheated acetic acid vapour being supplied to the reaction zone or actually into the reaction zone. Where a solution or suspension of the copper compound is introduced into the stream of acetic acid vapour, this solution or suspension should be of such a concentration that the quantity to be introduced is quite small in relation to the quantity of acid subjected to thermal dehydration, representing say about 5% of the weight of the acid. The solution or suspension of the copper compound may also contain a phosphorus-containing catalyst, for instance ammonium phosphate. On the other hand, separate solutions of the copper compound and of a phosphorus compound may be introduced into the acid vapour. The solution of the phosphorus compound, like the solution of the copper compound, should be of such a concentration that the quantity of solution to be introduced is quite small, for example about 5% of the weight of the acid. Preferably the phosphorus compound is in solution in water or aqueous acetic acid.

Where bases as well as phosphoric acid are to be employed in the process, the quantity of base may be of the order of 1% of the weight of the acetic acid subjected to decomposition or may be less, e. g. 0.2 to 0.5%. Similarly the proportion of phosphoric acid may be quite small and may be equivalent to the amount of base used. It is to be understood that, instead of phosphoric acid, substances yielding phosphoric acid may be employed, and instead of the phosphate of a base, the base together with a substance yielding phosphoric acid may be employed.

Preferably in carrying out the process of the invention the acetic acid is preheated before it is introduced into the reaction zone, in particular to a temperature within 20–70° of the temperature at which the thermal dehydration is to be effected; but if desired the vapour may only be heated to within say 100° C. of this temperature, or may be heated right up to the temperature of the thermal dehydration. As previously indicated, temperatures of 600–900° C. are especially suitable for the thermal dehydration; very good results are obtained at temperatures of from 650 to 750° C.

The reaction is best carried out at atmospheric pressure or at reduced pressure. Reduced pressure is of advantage where acetic anhydride is the desired product, and is also of somewhat greater advantage where ketene is desired. Generally a mixture of ketene and acetic anhydride is produced.

The ketene and/or acetic anhydride may be recovered from the reaction products in any suitable manner. For example, the reaction products may be cooled so as to condense the whole of the acetic anhydride, water and unchanged acetic acid, and the ketene allowed to pass on, but preferably the reaction products may be subjected to a fractionation treatment designed to separate the acetic anhydride from the water and ketene. In such a process it is of advantage to employ liquids such as benzene, toluene, xylene, chlorbenzene, chloroform and the like which form an azeotropic mixture with the water.

While the invention has been described above principally in relation to the thermal dehydration of acetic acid, it may be applied to the thermal dehydration of other aliphatic acids, for example propionic acid, butyric acid and the like.

The following example illustrates without limiting the invention in any way.

Example

Acetic acid is vaporised and the vapour passed in a rapid stream successively through a preheating tube, wherein it is heated to 600–650° C., and through a reaction tube wherein it is heated to 670–720° C. Simultaneously there is forced into the reaction tube, at or near the point where the acetic acid vapour enters, a hot catalyst solution; this comprises an aqueous solution of phosphoric acid and ammonia, in amount and proportion corresponding to a 10% triammonium orthophosphate solution, holding in suspension 7% of cupric oxide. The catalyst solution is injected into the acetic acid vapours at such a rate that as the acid vapours pass through the reaction zone they contain altogether about 0.3% of their weight of phosphoric acid.

The gases leaving the reaction zone are subjected to fractional condensation in the presence of sufficient benzene to form an azeotropic mixture with all the water which they contain; the water and benzene are then condensed, and the gases remaining are washed with water or acetic acid to recover ketene.

Having described my invention, what I desire to secure by Letters Patent is:

1. Process for the thermal dehydration of lower fatty acids, which comprises subjecting the vapor of the acid to a temperature of from 500 to 1000° C. in the presence of phosphoric acid and copper oxide.

2. Process for the thermal dehydration of acetic acid, which comprises subjecting the vapor of acetic acid to a temperature of from 500 to 1000° C. in the presence of phosphoric acid and copper oxide.

3. Process for the thermal dehydration of lower fatty acids, which comprises introducing a solution of a compound yielding copper oxide under the dehydration conditions into the lower fatty acid vapor and subjecting the vapor of the acid to a temperature of from 500 to 1000° C. in the presence of phosphoric acid and copper oxide.

4. Process for the thermal dehydration of acetic acid, which comprises introducing a solution of a compound yielding copper oxide under the dehydration conditions into acetic acid vapor and subjecting the vapor of the acetic acid to a temperature of 600 to 900° C. in the presence of phosphoric acid and copper oxide.

5. Process for the thermal dehydration of lower fatty acids, which comprises introducing a solution of a compound yielding copper oxide under the dehydration conditions into the lower fatty acid vapor and subjecting the vapor of the acid to a temperature of from 500 to 1000° C. in the presence of phosphoric acid and up to about 3% of copper oxide based on the weight of the fatty acid.

6. Process for the thermal dehydration of acetic acid, which comprises introducing a solution of a compound yielding copper oxide under the dehydration conditions into acetic acid vapor and subjecting the vapor of the acetic acid to a temperature of 600 to 900° C. in the presence of phosphoric acid and about 0.2%–1% of copper oxide based on the weight of acetic acid.

7. Process for the thermal dehydration of lower fatty acids, which comprises introducing a solution of a substance selected from the group consisting of phosphoric acid and substances yielding phosphoric acid under the dehydration conditions into the vapors of a fatty acid, and then subjecting the vapors of the acid to a temperature of from 500 to 1000° C. in the presence of phosphoric acid and copper oxide.

8. Process for the thermal dehydration of acetic acid, which comprises introducing a solution of a substance selected from the group consisting of phosphoric acid and substances yielding phosphoric acid under the dehydration conditions into acetic acid vapor and subjecting the vapor to a temperature of 600 to 900° C. in the presence of phosphoric acid and copper oxide.

9. Process for the thermal dehydration of lower fatty acids, which comprises subjecting the vapor of the acid to a temperature of from 500 to 1000° C. in the presence of phosphoric acid, copper oxide and a nitrogen-containing base.

10. Process for the thermal dehydration of acetic acid, which comprises subjecting the vapor of acetic acid to a temperature of from 600 to 900° C. in the presence of phosphoric acid, copper oxide and a nitrogen-containing base.

11. Process for the thermal dehydration of actic acid, which comprises introducing a suspension of a compound selected from the group consisting of copper oxide and compounds yielding copper oxide under the dehydration conditions into acetic acid vapor and subjecting the vapor of the acetic acid to a temperature of 600 to 900° C., in the presence of phosphoric acid and copper oxide.

12. Process for the thermal dehydration of lower fatty acids, which comprises introducing a suspension of a compound selected from the group consisting of copper oxide and compounds yielding copper oxide under the dehydration conditions into the lower fatty acid vapor and subjecting the vapor of the acid to a temperature of from 500 to 1000° C. in the presence of phosphoric acid and up to about 3% of copper oxide based on the weight of the fatty acid.

13. Process for the thermal dehydration of acetic acid, which comprises introducing a suspension of a compound selected from the group consisting of copper oxide and compounds yielding copper oxide under the dehydration conditions into acetic acid vapor and subjecting the vapor of the acetic acid to a temperature of 600 to 900° C. in the presence of phosphoric acid and about 0.2% to about 1% of copper oxide based on the weight of acetic acid.

14. Process for the thermal dehydration of lower fatty acids, which comprises introducing a suspension of a substance selected from the group consisting of phosphoric acid and substances yielding phosphoric acid under the dehydration conditions into the vapors of a fatty acid, and then subjecting the vapors of the acid to a temperature of from 500 to 1000° C. in the presence of phosphoric acid and copper oxide.

15. Process for the thermal dehydration of acetic acid, which comprises introducing a suspension of a substance selected from the group consisting of phosphoric acid and substances yielding phosphoric acid under the dehydration conditions into acetic acid vapor and subjecting the vapor to a temperature of 600 to 900° C. in the presence of phosphoric acid and copper oxide.

HENRY DREYFUS.